US005436069A

United States Patent [19]

Winterowd et al.

[11] Patent Number: 5,436,069

[45] Date of Patent: Jul. 25, 1995

[54] SURFACED CELLULOSE COMPOSITE PANEL AND PANEL FORMING METHOD

[76] Inventors: Jack G. Winterowd, Seattle; David W. Park; J. Harry Wirz, both of Puyallup; Roland E. Kreibich; Roger M. Shantz, both of Auburn; Timit Ghermay, Seattle; Charles C. Childress, Auburn, all of Wash.

[21] Appl. No.: 110,338

[22] Filed: Aug. 23, 1993

Related U.S. Application Data

[63] Continuation of Ser. No. 831,243, Feb. 5, 1992, abandoned.

[51] Int. Cl.[6] .................. B32B 5/20

[52] U.S. Cl. .................. 428/308.8; 428/318.4; 428/318.8; 428/537.1

[58] Field of Search .................. 428/308.8, 318.4, 318.8, 428/537.1

[56] References Cited

U.S. PATENT DOCUMENTS

| | | | |
|---|---|---|---|
| 3,476,634 | 11/1969 | Fleischmann | 428/318.8 |
| 3,607,595 | 9/1971 | Windecker | 156/71 |
| 4,087,296 | 5/1978 | Hooker | 156/71 |
| 4,102,975 | 7/1978 | Doerer | 264/322 |
| 4,201,802 | 5/1980 | Vande Kleft | 427/370 |
| 4,732,957 | 3/1988 | Schuster et al. | 528/58 |
| 4,765,105 | 8/1988 | Tissington et al. | 52/309.11 |
| 4,940,632 | 7/1990 | Nicola et al. | 428/318.4 |

FOREIGN PATENT DOCUMENTS 136806 6/1991 Japan .

*Primary Examiner*—George F. Lesmes
*Assistant Examiner*—Blaine R. Copenheaver
*Attorney, Agent, or Firm*—Klarquist Sparkman Campbell Leigh & Winston

[57] ABSTRACT

A method of producing a surfaced composite panel of cellulosic particulates, such as wood flakes, involves the application of polymer forming foamable material to at least one of the first and second major surfaces of the panel, contacting said at least one of the first and second surfaces with a pressure applying surface to apply pressure thereto, foaming the polymer forming foamable material while pressure is applied and curing the applied foam material to produce a polymeric coating on the panel with the desired surface, which is typically extremely smooth. One or both surfaces may be surface treated in this manner. A skin formed on the surface of the panel is believed to add to the strength and stiffness of the coating on the panel. A wide variety of foaming systems may be used to accomplish this surface treating. By avoiding sanding the surface treated panel, the skin remains intact. The resulting panel, in addition to being extremely smooth as desired, resists water penetration when subjected to water or high humidity conditions. The resulting panel is receptive to adhesives for purposes of securing overlaying materials such as vinyl, reduces formaldehyde emissions when a panel formed of the resin which emits formaldehydes is surface treated.

19 Claims, 3 Drawing Sheets

PROCESS FLOW CHART

CHANGE IN MACHINE DIRECTIONAL WARP VS TIME FOR DIFFERENT BOTTOM CAUL PLATE TEMPERATURES

SURFACED CELLULOSE COMPOSITE PANEL AND PANEL FORMING METHOD

This application is a continuation, of application Ser. No. 07/831,243, filed on Feb. 5, 1992, now abandoned.

TECHNICAL FIELD

The present invention relates to panels of cellulosic particulate materials, such as wood-based composite boards, which are surfaced with a coating material to eliminate irregularities and to a method of making such panels.

BACKGROUND OF THE INVENTION

Composite panels of cellulosic particulate material, including panels of ligno-cellulosic particulate materials, are known. These composite panels are made by adhering small pieces or particles of cellulosic material, such as sawdust, wood fibers, and wood flakes into a larger sheet form. Other cellulosic materials may also be assembled into sheets in the same manner. Without limiting the generality of the term "cellulosic material", straw is another specific example.

Commercial products formed using these known technologies include panels such as plywood, particle board, fiber board, flakeboard, and various end-jointed, edge-jointed, and face-jointed structural members. During the production of particle board, fiber board and flakeboard, small pieces of wood are treated with adhesive and assembled into a mat. The mat is then compressed into a high density panel, typically in sheet form, by use of heat and pressure. These panels vary in thickness, for example from about one-eighth inch to about six inches. Typically, phenolic or other resins are used in making these panels with phenol-formaldehyde resins being a specific example. Panels produced using this latter resin release minute quantities of formaldehyde during curing of the resin and while the panels are in use. It is desirable to reduce this release of formaldehyde for environmental reasons.

Depending upon the size of the wood or other cellulosic materials used in the composite panel, the panels may contain voids and surface defects or irregularities. In general, the size of the voids increase with the size of the particles used in forming the panel. For example, because flakeboard is manufactured from relatively large pieces of wood (e.g. one-half inch to six inch long flakes of up to about two inches in width or more), the surface is rough when compared to particle board or fiber board, which are made from much smaller wood pieces. In spite of its rough surface, flakeboard has bending strength and stiffness values which are several times greater than those of particle board and fiber board. For many applications, it would be desirable to have a panel with the strength of flakeboard, and yet which minimizes surface voids.

As a specific example of one such application, when resilient floor covering, such as vinyl sheets, or ceramic tile are used for flooring, these materials typically must be installed on a smooth, flat surface. A builder generally attains a flat, smooth supporting surface by installing a thin board on top of structural flooring. This thin board or panel is termed "underlayment" and generally has consisted of one-quarter to one-half inch thick plywood, fiber board, particle board, or sanded flakeboard. Of course, the thickness may be varied for particular applications.

Of these options, plywood provides a very smooth surface and is also resistent to swelling when wet. However, plywood is generally more expensive than other underlayment materials and is made from resources which are becoming less available as trees suitable for making plywood veneers become more costly and difficult to obtain. In contrast, fiber board, particle board, and flakeboard are less expensive than plywood due in part because they are made from a more readily available raw material source, such as smaller trees. However, fiber board, particle board, and flakeboard swell drastically when wet. This can occur, for example, when these materials are used as underlayment in bathroom, entry, kitchen sink, or laundry room areas which over time may become wet with water that then seeps into the underlayment. When these materials become wet, they may then swell and damage the overlaying floor material.

In addition, flakeboard has a unique disadvantage when used for underlayment. That is, the surface voids in flakeboard tend to telegraph through vinyl floor covering. Thus, surface smoothness, which is inherently present in plywood, particle board, and fiber board, but not in flakeboard, is an extremely important property of underlayment utilized beneath flooring materials such as vinyl flooring. A smooth, void-free surface is also desirable in an underlayment panel because it facilitates the cleanup of construction debris after the panel has been installed. Even tiny pieces of sawdust or other particles lodged under vinyl flooring can show up as a bump or projection in the surface of this flooring. This is especially true for increasingly popular "perimeter attached" vinyl floor covering.

Unless it is sanded, flakeboard is generally not suitable as an underlayment for floor covering. Its surface contains far too many voids, and the normal thickness variability between panels creates ridges where the panels meet on a floor. These ridges tend to show through the floor covering. Sanding the flakeboard panels can eliminate the ridges. However, sanding involves the cost and time of an additional manufacturing step. In addition, as a practical matter, even extensive sanding does not eliminate voids between large flakes in flakeboard.

Another problem arising from the use of flakeboard as an underlayment arises from the tendency for pieces of bark within the flakeboard to stain a vinyl flooring overlay. Bark contains large amounts of extractable tannins, which can bleed through vinyl overlays and result in an undesirable stain. This problem is especially acute for "perimeter attached" vinyl floor covering.

In addition to floor underlayment, there are other applications where flakeboard could be used more readily if it had a smooth, void-free surface and simultaneously maintained its structural properties. A specific example is in the manufacture of office furniture where flat work surfaces must span sixty inches or more and still resist deflection. Sanded oriented strand board, a type of flakeboard with layers of flakes oriented in desired directions, has been used as a substrate in furniture applications. However, extraordinary steps typically must be taken by a furniture manufacturer to make the surface useable. A smooth surfaced oriented strand board would greatly facilitate its use in this application.

The inventors have also attempted to solve these problems by applying a phenolic resin to flakeboard and curing the resin. However, the applied resin tended to seep into the porous flakeboard and when cured did not fill the voids in the board.

Therefore, a need exists for a cellulosic composite panel having a desired surface treatment, and in particular for a smooth surfaced flakeboard panel. A need also exists for an effective method of forming such panels.

SUMMARY OF THE INVENTION

In accordance with one aspect of the present invention, a surfaced composite panel of cellulosic particulates, such as wood flakes, is formed with a desired surface on at least one of the two major surfaces of the panel. Although the size of these panels may be varied, one common size is a four foot by eight foot sheet with the major surfaces being the respective faces of the sheet. In accordance with the method, a polymer forming foamable material is applied to at least one of the first and second major surfaces of the panel so as to coat this surface with the polymer forming foamable material.

As a specific example, a liquid polymer forming foamable material typically comprised of monomers, prepolymers, together with a blowing agent, and optional dilutants, surfactants and other additives may be spread or otherwise applied across the surface of the panels. The excess liquid polymer forming foamable material is removed, for example by being doctored off. The surface or surfaces with the polymer forming foamable material is then contacted with a pressure applying surface, such as a platen of a press, to apply pressure thereto. Both the major surfaces of the panel are preferably subjected to pressure, even in the case where the polymer forming foamable material is not applied to both major surfaces so as to fully support the panel during processing.

The polymer forming foamable material is then foamed, for example by heating the panel to cause boiling of a blowing agent in the foamable material or by adding a foam activation agent to the foamable material. Foaming then occurs while the surface or surfaces are subjected to pressure. As a result, the applied liquid foamable material expands and fills the surface voids of the panel. In addition, as a result of the contacting pressure applying surface, the surface of the panel assumes the configuration of the pressure applying surface, which may be textured, but is most preferably smooth. As a result, in this latter case the resulting surface coating is correspondingly smooth. The foamed polymer forming material is then cured while pressure is simultaneously applied by the pressure applying surface. By cured, it is meant that the foamed liquid is treated, typically by heat, while under pressure at a temperature and for a time which is sufficient to prevent the foamed liquid from subsequent expansion or contraction when pressure is relieved from the major surfaces of the panel.

When the surfaced composite board, which may be surfaced with the foamed polymer material on both major surfaces or only one major surface is removed from the pressure applying mechanism, the resulting composite panel has a cured foamed polymeric material surface in which the original gaps, for example between flakes of flakeboard, have been filled with the polymeric material. In addition, a skin is formed on the surface of the cured polymeric foam which enhances the strength and stiffness of the foam coating of the surfaced composite panel. That is, the flakes on the surface of the flakeboard panel are covered with a thin polymeric membrane with essentially the entire surface being covered with the applied polymer, either as a foam or as a membrane. That is, in the ridge areas of the composite panel, where very little space existed between the flakes and the pressure applying surface, a thin membrane of polymeric material exists. In contrast, at locations where larger gaps existed between the flakes and pressure applying surface, the bulk of the volume of the gap is filled with foamed polymer material while the surface at these locations has the thin polymer membrane. Except for possibly a few small pin holes or minute voids scattered throughout the surface of a panel, virtually the entire surface of the panel has the desired surface coating. The entire surface need not be coated with the foamed surface, for example, only the voids may be filled. However, in this case, the unsurfaced portions of the panel would be prone to swell to a greater extent if insulted with water.

When a phenolic based liquid foaming system is used, a typical membrane or skin thickness is about five microns with a typical density being approximately eighty pounds per cubic foot. This skin is substantially bubble-free as compared with the foamed material beneath the skin in the gaps of the panel. The foamed material, in comparison to the skin, typically has a density of from about five to about twenty pounds per cubic foot. These densities may be varied by varying the foam forming material and applied pressure. Preferably, the treated surface is not sanded prior to shipment to a user. The surface skin would be removed or damaged by sanding, which would detract from the expected stiffness and strength of the foam coating. Also, if the membrane is sanded off, the coarser underlying foam structure would be positioned at the surface of the panel.

A wide variety of liquid foaming systems may be utilized in coating or surfacing the panel. Both thermoset and thermoplastic based materials may be used. Conventional resoles, blowing agents and acids may also be used. In addition to phenolic based foaming systems, polyurethane based foaming systems are another specific example. Other specific foaming systems include phenol/aldehyde based resins, urea/aldehyde based resins, melamine/aldehyde based resins, a resorcinol/aldehyde based resin, an epoxy based resin, or any other polymer foam which can be generated within the surface voids of panels by applying a mixture of monomers and/or prepolymers and/or polymers. Blowing agents are included with these polymer forming foamable materials, with the blowing agents being selected to be compatible with the base material. For example, pentane or hexane may be included in phenolic foaming systems. These materials boil when subjected to a foam forming temperature at a given pressure, causing the polymer forming foaming material to foam and fill the voids in the panel. Other blowing agents react with activating agents to cause foaming. For example, calcium carbonate causes foaming when an acid is added, causing the release of carbon dioxide and the foaming of the system. Thus, the invention is not limited to the specific type of polymer foaming system, although phenolic based systems have proven particularly advantageous. Curing agents and/or other desired auxiliary agents may also be added to the board surface, including but not limited to, fillers, pigments, fire retardants, pesticides, anti-fungal agents, and anti-bacterial agents.

The panel surface to be loaded with the polymer forming foamable material is loaded with an amount which is sufficient to fill voids in the panel when the material is foamed. Typically, panels are loaded with from 0.1 to 50 pounds per 1000 square feet of panel surface to be coated, with a preferred loading range being from 5 to 15 pounds per thousand square feet. During contacting of the applied material with a pressure applying surface, typically from 1 psi to 1000 psi of pressure may be applied to the major surfaces of the panel. The upper limit of pressure would be the crush strength of the panel. More typically, from about 30 psi to about 300 psi of pressure is applied, with 30 psi of pressure being a most preferred pressure. The pressure may be applied in any convenient manner. However, the use of platens in a press are convenient because presses are commonly available in plants where composite panels are being made. The platens may be heated to facilitate foaming and curing of the applied material.

As previously mentioned, for certain types of blowing agents, the temperature of the applied foamable material is raised until the blowing agent boils at the pressure being applied to the panel. Temperatures of from 20° C. to 300° C. are typical, with a preferred temperature for a pentane based blowing agent being in excess of 40° C. However, for phenolic based foaming systems for foaming and curing, a temperature of about 100° C. is preferred. To cure the panel, the treated surface is typically maintained at the desired pressure and temperature for a time which is sufficient to cure the foamed polymer so that when pressure is relieved the polymer does not collapse, leaving voids in the surface, or continue to expand, forming projections in the panel surface. The term cured is therefore, for purposes of this application, defined to mean curing the surface material sufficiently while pressure is applied so that when pressure is relieved the material does not collapse or expand to any significant extent (beyond plus or minus 0.02 inch).

Assuming only one of the major surfaces is coated with the surfacing material, it has been found to be advantageous to hold the other major surface at a temperature which is at least as great as the temperature of the major surface containing the foamable material during foaming and curing of this material. Under these conditions, warpage of the panel is reduced. Similarly, if both major surfaces of a panel are to contain a polymeric foamed surface in accordance with the present invention, during foaming and curing both surfaces are preferably subjected to approximately the same temperature to again reduce warpage.

Panels formed in accordance with the present invention exhibit an exceptionally smooth surface with a "polished" appearance, when pressed by a smooth contact surface during foaming and curing of the polymeric forming foamable material. This treated surface is free of voids otherwise present in panels of particulate cellulosic materials, such as flakeboard panels.

In addition, panels surfaced in this manner do not readily stain a vinyl overlay flooring. Also, formaldehyde emissions from phenol-formaldehyde resin flakeboard panels coated in this manner are typically less than those from nonsurfaced flakeboard made with a phenolformaldehyde resin.

Panels surfaced in this manner are also resistent to swelling upon insult by liquid or water vapor.

Moreover, strong adhesive bonds between vinyl floor covering and panels surfaced in the manner of the present invention are achievable utilizing conventional adhesives.

In addition, the warpage of panels surfaced in the manner of the present invention can be reduced to a level which is comparable to nonsurfaced materials of the same substrate.

Therefore, it is an overall objective of the present invention to provide an improved method of surfacing a cellulosic composite panel, and in particular flakeboard panels and improved composite panels with a surface coating.

These and other objects, features and advantages of the present invention will become more apparent with reference to the following detailed description and drawings.

DETAILED DESCRIPTION OF PREFERRED EMBODIMENT

The present invention relates to surface treating composite panels of cellulosic material and has particular applicability to panels of ligno-cellulosic material. Such panels which naturally have a rough or irregular surface, such as wood flakeboard, benefit the most from the present invention. Cellulosic panels of this type are formed in a conventional manner, typically by laying up pieces of cellulose materials, whether they be wood flakes or other materials, in the form of a mat. Typically, adhesives or resins are sprayed or otherwise applied to the pieces. Temperature and pressure is then applied to compress the mat into an adhered panel. These panels typically exhibit some porosity. In addition, panels of relatively large particles such as wood flakes have voids and gaps throughout, including on the major surfaces of the panels. Panels of this type are commonly from about one-eighth to six inches thick and take the form of sheets, with four foot by eight foot sheets being one common size. These sheets have respective major surfaces or faces bounded by peripheral edges.

A polymer forming foamable material is applied to at least one of the major surfaces of the panel, and may be applied to both of the major surfaces of the panel if a surface coating is desired on both such major surfaces. For underlayment applications, the treated surface is normally formed only on one side of the panel, with the treated surface then being positioned directly beneath the overlaying flooring material when the panel is used.

As previously explained, the polymer forming foamable material is typically made up of monomers, and/or prepolymers and optionally some polymers together with a blowing agent for causing foaming during processing of the surface treatment material. Surfactants, dilutants, and additives may also be included in the polymer forming foamable material. Phenolic resin based foaming systems, thermoset resin based foaming systems and thermoplastic resin based foaming systems are all suitable for practicing the present invention. In general, the polymer forming foamable material must be capable of expanding to fill the voids in the surface of the panel when foamed. The foaming mixture therefore must contain a blowing agent at a concentration which is high enough to expand the foaming formulation to the extent that all of the surface voids become filled during the pressing and curing step. If incomplete gap filling is observed for a particular foaming mixture, then one should increase the concentration of the blowing agent in the formulation. It should be noted that decreasing the cure time of the foaming formulation would in some cases also correct the problem of incomplete gap filling. Thus, it will be readily apparent to those of ordinary skill in the art how to adjust a particular foaming system to fill the gaps of a panel.

Figure 1:
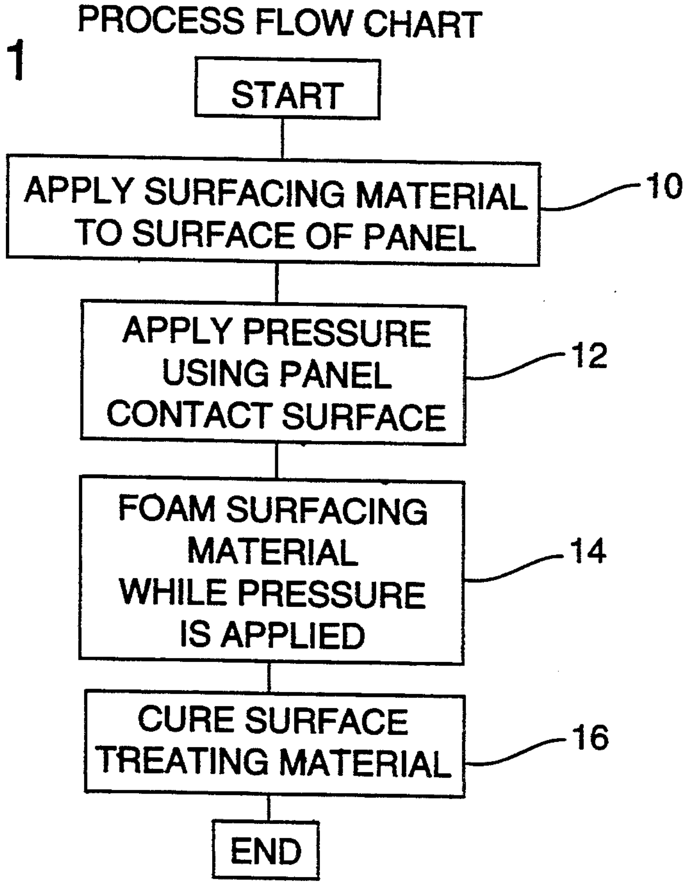
FIG. 1 is a flow chart illustrating the composite panel surfacing process of the present invention.

With reference to the process flow diagram of FIG. 1, the polymer forming foamable material is applied to the panel, as indicated at block 10 in this figure, in an amount which is sufficient to fill the voids when foaming takes place. Loading of this material may be varied over a wide range, such as from 0.1 to 50 pounds per 1000 square feet of surface area to be treated. Preferably the material is loaded in an amount of between five to ten pounds per 1000 square feet.

The polymer forming foamable material is applied by spreading the material across the surface of the panel. Typically a flexible doctoring blade of rubber, metal or other suitable material is used to spread the polymer forming foamable material. Of course, other application devices may be used, such as rollers with the nip between the roller and surface to be treated defining the amount of polymer forming foamable material which is applied to the panel surface. The applied material fills voids and gaps in the panel and also, due to the porosity of cellulosic particulate composite panels, tends to seep somewhat into the substrate of the panel. Some polymer forming foamable material, typically at least about one micron, remains on all of the surface areas of the panel, including ridges (for example, raised edges of flakes) of the composite panel.

The surface to which the polymer forming foamable material is applied is contacted with a pressure applying surface, such as the platen of a press, to impart pressure to this surface. This is indicated by block 12 in FIG. 1. Simultaneously, pressure is also applied to the other surface of the panel, such as by another platen of the press, so that the panel is not deformed during the pressure applying step. Although these platens may be textured if desired to impart a textured surface to the polymer forming material treated panel, it is most preferred that the pressure applying surface is smooth. In this latter case, when the polymer forming foamable material is foamed and cured, the resulting polymeric surface on the composite panel is also smooth, making the panel particularly suitable for applications requiring a smooth surface, such as when used for underlayment.

The pressure exerted on the board by the pressure applying surface must be sufficiently high to prevent the foaming mixture from expanding out of the board, but should not be so great that it crushes the board. Pressures from 1 psi to 1000 psi, or the crush strength of the panel, would be suitable. More typically, pressures from about 30 psi to about 300 psi are preferred with a pressure of 30 psi being most preferred for phenolic based foaming systems.

The surfacing material is foamed while pressure is applied to the panel surfaces. This is indicated at block 14 in FIG. 1.

The platen is typically heated, particularly when foaming systems of the type requiring boiling of a blowing agent are required to accomplish foaming. That is, the temperature must be raised above the boiling point or foaming temperature for the particular blowing agent for the given pressure. The temperature at the foam or surface treatment side or sides of the board should preferably be approximately equal to the maximum temperature that the foaming mixture would reach if it were mixed in an insulated container and allowed to free rise. If there is a major surface of the panel which is not treated with the polymer forming foam material, it should be subjected to a temperature, for example by the platen, which minimizes permanently induced warp in the board. The work performed as of this time by the inventors suggests that the non-foam-treated surface of the board should be subjected to a temperature which is at least as high as the temperature at the foam-treated surface of the board to minimize warpage.

Although variable for different foaming systems, temperatures of from 20° C. to 300° C. would typically be used in the present invention, with the temperature being applied for a typical time period of from about one second to about 300 seconds. For a phenolic foam based system, a preferred temperature would be about 100° C. for about 30 seconds. The application of heat and pressure to the foaming mixture cures the foam on the surface of the board. This curing step is indicated at block 16 in FIG. 1. Before relieving the pressure, the foaming mixture must be allowed to cure to the point that the foam no longer expands or contracts when the pressure is relieved. If the formulation cures before it completely fills the surface voids, then incomplete gap filling will be observed and the cell structure of the foam is likely to be very poor. If the formulation cures after the pressure is relieved from the board, then either the foam will expand out of the plane of the board, or the foam will contract into the recesses of the board. Adjusting the cure time of a particular foaming formulation to achieve the desired cure may be readily accomplished for a given foaming system.

Figure 2:
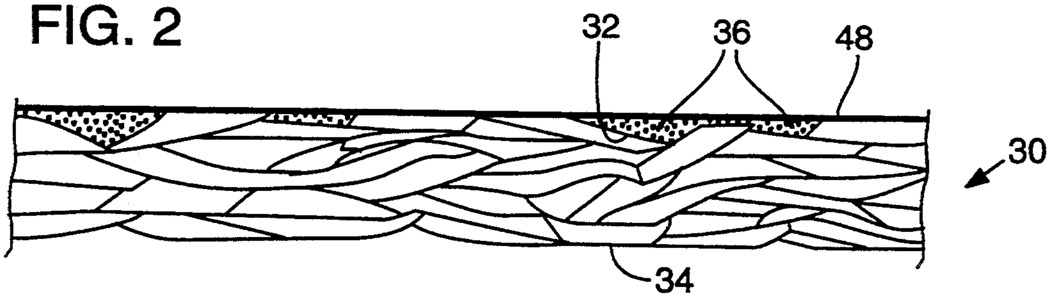
FIG. 2 is a sectional view of a portion of a composite panel, in this case of a flakeboard panel, having one major surface coated in accordance with the present invention.
Figure 3:
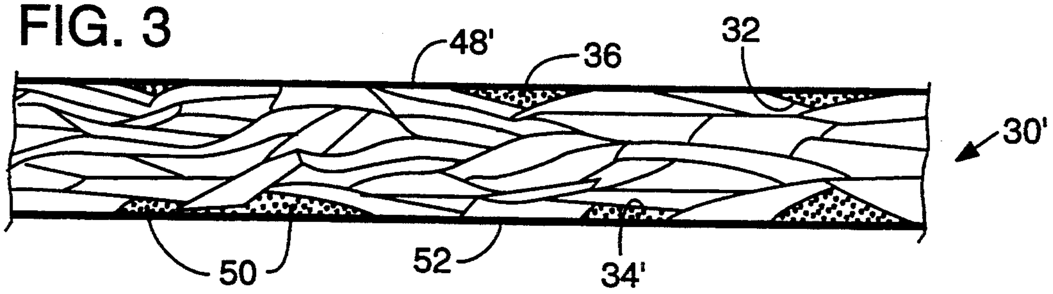
FIG. 3 is a cross-section of a portion of a composite panel, again a flakeboard panel, having two major surfaces coated in accordance with the present invention.

The resulting panel with the surface treatment contains a polymeric coating on the treated surface or surfaces. Sections of exemplary panels are illustrated in FIGS. 2 and 3. In these figures, panels 30, 30' of particulate cellulosic materials, in this case wood flakes, are shown with repetitive first and second major surfaces 32, 32' and 34, 34'. Prior to treatment in accordance with the present invention, these panels have surface, as well as internal, voids, gaps and irregularities. In FIG. 2, surface 32 is shown with an applied polymeric foamed material 36. In FIG. 3, the surfaces 32' and 34' each have the applied polymeric foamed surface treatment, indicated by the numbers 36' and 50, respectively. By foaming the material under pressure in contact with the pressure applying surface, a skin forms on the treated surface. This skin is indicated by the number 48 in FIG. 2 and by the numbers 48' and 52 in FIG. 3. This skin is typically about five microns thick, but would vary with the applied pressure, and is substantially bubble free. The skin has a much higher density than the density of the foamed material underneath the skin, with an exemplary skin density being approximately 80 pounds per cubic foot for a phenolic based foaming system. In contrast, although variable depending on the foam system and pressure, a typical density of the foamed material in the voids beneath the skin is from about five to about twenty pounds per cubic foot. It is preferable that the treated surface not be sanded prior to shipment to a user. That is, sanding can damage or remove the skin. The skin is believed to enhance the stiffness and strength of the treated surface and therefore for most applications it is preferred to retain the skin.

The method of preparation of one specifically preferred liquid foaming system used in the present invention is as follows. A 1000 mL reactor was charged with 90 percent phenol [Allied Corp., Philadelphia, Pa.] (261 g, or 2.5 moles phenol), 91 percent prill paraformaldehyde [Hoechst Celanese Chemical Group, Dallas Tex.] (100 g, or 3.0 moles formaldehyde), and a solution of anhydrous sodium carbonate (1.700 g) in tap water (37 mL). The mixture was stirred and heated from 22° C. to 105° C. in 45 minutes and was then maintained at a temperature of between 95° C. and 100° C. until the viscosity had reached a value of about 550 cp. The viscosity was determined by use of Garner-Holdt bubble tubes at a temperature of 22° C. The contents of the reactor were then cooled to a temperature of 15° C. and type L-6900 silicone surfactant [Union Carbide Chemicals and Plastics Co., Inc., Danbury, Conn.] (25 g) and pentane (12 g) as a blowing agent were added to the mixture with continued stirring. The resin was transferred to a sealed container and stored at 5° C.

The resole described above has been found to coacervate (coagulate due to electrostatic attractive forces) upon cooling if the viscosity is increased beyond a value of about 620 cp by heating, and a coacervated resin is difficult to handle during the application step. Thus, it is preferred that the viscosity of this particular resin not be advanced to a value greater than 600 cp. However, the higher the molecular weight of the resole is, the lower the formaldehyde emission is, and so it is generally preferred that the resin viscosity should be advanced to as high of a level as possible. Also, we have observed foam shrinkage and foam cracking when the viscosity of this resin is less than about 450 cp. The ratio of formaldehyde to phenol has also been selected so as to provide very low formaldehyde emissions in the final product. The lower this ratio, the lower the formaldehyde emission. Types and amounts of bases other than that shown above can be used, although this will likely change the necessary heating schedule for resin synthesis purposes and the amount of acid used in the application step. In general, using small amounts of a weak base is advantageous because the resulting resin has a long shelf life and requires only a small amount of acid to cure. More water could be used than is shown in this specific example and this would allow one to advance the resole to a higher molecular weight. Decreasing the amount of blowing agent in the formulation will yield a higher density foam that fills the voids, but if one lowers the blowing agent too much, incomplete gap filling will be observed. Different blowing agents such as calcium carbonate or any compatible, low boiling point liquid could be substituted in place of the pentane. The surfactant could also be adjusted, but generally some agent which lowers the surface tension of the resin to a value of less than 50 dynes/cm is preferred in order to achieve a fine cell structure in the foam. Any of these parameters in the formulation can be varied in order to tailor the coating to specific needs. Also, other resin types such as polyurethanes, urea/formaldehyde condensation resins, melamine/urea condensation resins, resorcinol/urea condensation resins or epoxy based systems can be used.

The preferred resin described above has been used to prepare a surface enhanced oriented strand board. An example of one successful application technique is as follows. The phenolic resin (20 g) was vigorously mixed with type 11704 PLENCO hardener [Plastics Engineering Co., Sheboygan, Wis.] (6.0 g) and the mixture was immediately spread out on a section of $\frac{1}{4}$ inch thick oriented strand board [Weyerhaeuser Co., Grayling, Mich.] by use of a rubber knife. The knife was a flexible doctor blade extending the full width of the sheet, and in this case was made of rubber of the type utilized in window cleaning "squeegees". The coating weight was about 4 g/ft$^2$. The treated board was immediately subjected to a pressing operation in which the top and bottom platens were at a temperature of about 100° C. the pressure was about 30 psi, and the time of pressing was 30 seconds. A caul plate which had a smooth release material coated surface (Teflon being the brand of release material used in this example) was used between the treated board and the top platen. After pressing, the board was removed and allowed to cool to 22° C. and rehydrate under ambient conditions (i.e. 30 to 70 percent relative humidity).

The board prepared as described in the preceding paragraph had a highly uniform caliper and a surface which was much smoother than the surface of the nontreated oriented strand board. Surface smoothness can be quantified, for example, by making many point caliper measurements on a board and calculating the coefficient of variation of the set of data.

A specific procedure for calculating surface smoothness is as follows. Specifically, samples of $\frac{1}{4}$ inch underlayment may be marked with a 42 point grid pattern having six rows and seven columns. The spacing of the grid points was 0.86 by 0.75 inch with the samples being six inches wide by six inches long. The specimens were conditioned at 50±5 percent relative humidity and 70°±2° F. for 24 hours prior to the test or until practical equilibrium was attained. A one inch deep throat micrometer mounted on a 12 inch flat bed with a semi-needle point tipped stylus (a type 6632/8 special contact point, L.S. Starrett Co., Athol, Mass.) accurate to 0.001 inch was used to measure the caliper at each of the grid points. The force applied to the stylus in making these measurements was 0.5 pounds. A total of five specimens were tested. A thickness means, standard deviation, coefficient of variation, maximum and minimum for each test location (count) of each specimen was computed. Thus, 42 such counts were determined for each specimen. The rougher the surface the greater the coefficient of variation.

Table 1 compares the surface smoothness of sections of nontreated oriented strand board, oriented strand board treated with a foaming formulation as described above, and a section of lauan plywood. The data in Table 1 suggests that the flakeboard described in this invention has a surface which is superior to lauan plywood in terms of caliper uniformity.

TABLE 1

Caliper Uniformity of Wood Types by Point Caliper Measurements

| Wood Sample | Average Caliper (0.001 inches) | Coefficient of variation |
|---|---|---|
| Nontreated Weyerhaeuser ¼" oriented strand board | 0.231 | 1.401 (20.9) |
| Foam treated Weyerhaeuser ¼" oriented strand board (treated as set forth above) | 0.231 | 0.845 (29.6) |
| ¼" Lauan plywood | 0.213 | 1.201 (31.7) |

In the above table, the numbers in parentheses are coefficients of variation. As mentioned above, 42 measurements were made for each of five samples of each material type. A coefficient of variation value was calculated for each of the five samples and from these five values an average coefficient of variation was calculated. Along with the average value, a coefficient of variation of the coefficient of variation was calculated in order to help determine whether or not the average coefficient of variation values were different. The coefficient of variation values of the average coefficient of variation values are shown in parentheses.

Thus, the surface treated panel was extremely smooth and had a surface with a coefficient of variation of less than 1.0.

Composite panels having the foamed surface treatment of the present invention were compared to nontreated oriented strand board for its response to water. Measurements of the ability of the samples to resist swelling in environments of liquid water were made. These measurements are expressed in terms of (1) water adsorption (percent), which is the percent change in mass of the panel which corresponds to the adsorbed water, and (2) thickness swell (percent), which is the percent change in caliper of the panel. In these examples, the urethane foam was made from a foam forming material like 801.20 polyurethane formulation obtained from Polymer Developmental Laboratories, Inc., Orange, Calif. The isocyanate fraction and the polyol fraction of the formulation were meter mixed at a 1 to 1 ratio in a flexible lap top model meter mixing machine (Edge-Sweets Company, Grand Rapids, Mich.) and applied in the same manner as the phenolic foaming formulation described previously. The material was pressed for sixty seconds at 100° C. (top and bottom platens) and the pressure was 30 psi. In addition, the untreated panel in this table refers to a panel without a surface treatment. Also, the phenolic foam #1 treatment mentioned in this table is the treatment described in the example above. To test the resistance of each surface to penetration by liquid water, six inch x six inch samples of ¼ inch thick oriented strand board from Weyerhaeuser Company, surface treated as set forth in the table, were each centered on top (foam treated surface down) of 5.5 inches×5.5 inches rectangular-shaped sponges that were continuously wet with water at 22° C. A weight of 230 g was placed on top of each specimen to ensure that the test surfaces remained in intimate contact with the wet sponges. The increase in mass and thickness swell of the specimens was measured once per day over a period of seven days. The results of the last measurement in comparison to the starting material are shown in Table 2 below.

TABLE 2

Sponge Soak Test

| | Test Time (Days) | Water Adsorption (%) | Thickness Swell (%) |
|---|---|---|---|
| UNTREATED ¼" | 0 | 0.0 | 0.0 |
| oriented strand board | 1 | 7.6 | 8.8 |
| from Weyerhaeuser | 2 | 11.3 | 12.9 |
| Company | 3 | 14.1 | 15.4 |
| | 4 | 16.8 | 17.6 |
| | 7 | 21.2 | 21.5 |
| URETHANE FOAM | 0 | 0.0 | 0.0 |
| TREATED ¼" oriented strand | 1 | 5.1 | 5.3 |
| board | 2 | 7.3 | 8.8 |
| | 3 | 8.8 | 10.7 |
| | 4 | 10.0 | 12.3 |
| | 7 | 11.9 | 15.7 |
| PHENOLIC FOAM #1 | 0 | 0.0 | 0.0 |
| TREATED ¼" oriented strand | 1 | 5.5 | 6.3 |
| board | 2 | 7.7 | 9.8 |
| | 3 | 9.2 | 11.9 |
| | 4 | 10.7 | 13.7 |
| | 7 | 13.3 | 18.1 |

These results confirm the resistance of material surface treated in accordance with the present invention to the adverse affects of liquid, and for that matter to high humidity conditions.

The formaldehyde emission of the virgin and treated (as in example I above) oriented strand board has been measured according to ASTM E 1333-90, with the results being reported in Table 3 below. Formaldehyde emissions have been observed to decrease with increased resole molecular weight, lower formaldehyde/-phenol ratios, increased acid/resole ratios and increased hot pressing time.

TABLE 3

Formaldehyde Emission

| Wood Type | Formaldehyde Emission (ppm) |
|---|---|
| ¼" nontreated Weyerhaeuser oriented strand board | 0.06 |
| ¼" single surface foam treated Weyerhaeuser oriented strand board | 0.02 |

This surface treatment in accordance with the present invention reduces the rate of formaldehyde emissions from formaldehyde containing panels.

Figure 4:
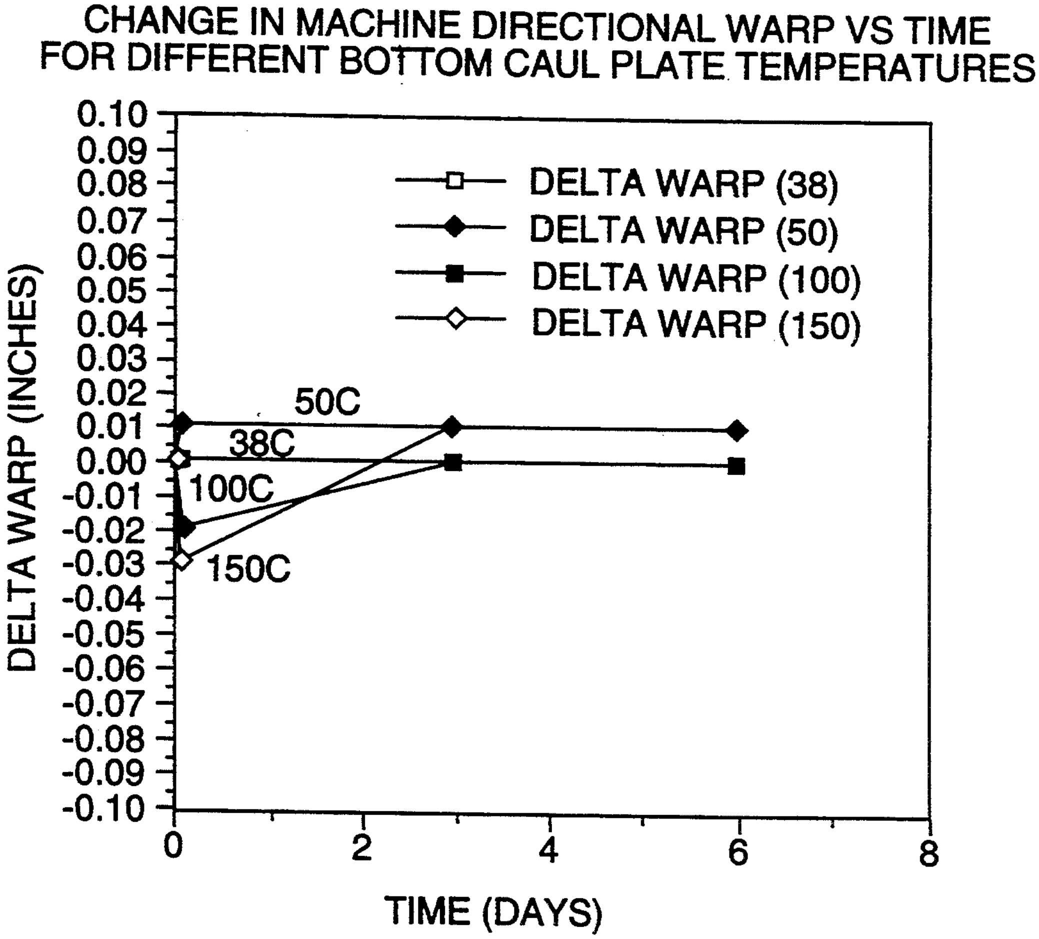
FIG. 4 is a graph illustrating the change in machine direction warp of a panel which surfaced in accordance with the present invention on only one major surface, with the opposing surface subjected to various temperatures during the treatment of the panel.
Figure 5:
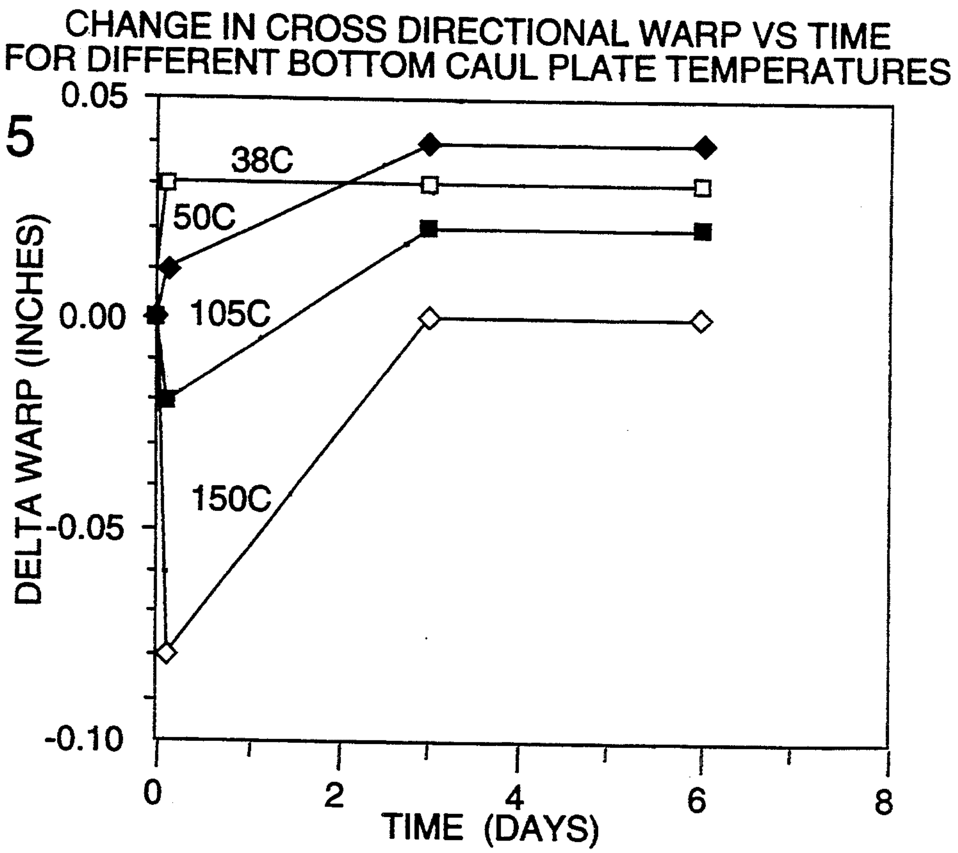
FIG. 5 is a graph illustrating the change in cross-machine directional warp for a composite panel surfaced on only one major surface and with the other surface subjected to various temperatures during treatment of the panel.

It has also been discovered that the process described in this invention may initially cause some warp in the panel when only one surface is being treated but, if the proper platen temperatures are selected, this warp dissipates after several days. FIGS. 4 and 5 illustrate the cross directional and machine directional warp of the treated boards when the top platen (against the polymer forming foamable material treated major surface) was held at 100° C. and the bottom platen (against the opposite untreated major surface) was held at either 38° C., 50° C., 105° C. or 150° C. The data shown in these figures suggests that warp is minimal when the bottom platen temperature is held at 150° C. More specifically, it appears that warpage is minimized by subjecting the untreated surface to a temperature which is at least as high as the temperature to which the treated surface is subjected.

The warp measurement consisted of placing a straight edge across a section of nontreated board ($20\times20$ inch dimensions) and measuring the distance from the straight edge to the board at the center of the board. This measurement was repeated immediately after the board had been treated and cooled and then again at three and six days. The warp values plotted in FIGS. 4 and 5 are not the absolute distance values between the board and the straight edge, but are the change in distance between the board and the straight edge. Thus, a value of zero implies that the board had the exact same warp that it initially had prior to being subjected to the surface enhancement process. It should be noted that in FIGS. 4 and 5, positive values of delta warp indicate that the board was concave toward the side which was subjected to the foam. Negative values of delta warp indicate that the board was cupped away from the treated side. It should also be noted that, although the change in warp is most dramatic one hour after surface modification when the bottom caul plate is held at a temperature of 150° C. this condition shows the least change in warp after a period of six days.

Figure 6:
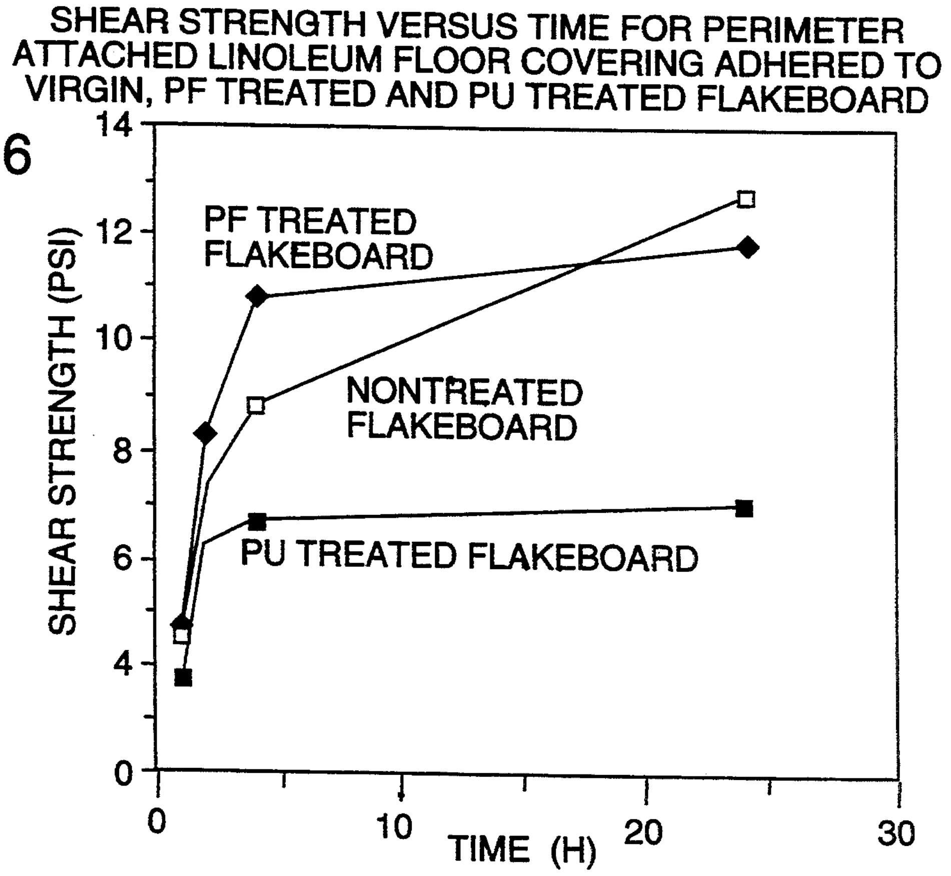
FIG. 6 is a graph illustrating shear strength versus time for perimeter attached vinyl flooring adhered to untreated and surfaced flakeboard.

The bond strength developed between flakeboard and flooring by use of conventional adhesives has been measured for the nontreated and treated oriented strand boards according to ASTM D 3632. FIG. 6 shows the results of this test in which the shear strength of the bond developed between flooring and the flakeboards was measured. The adhesive used in this experiment was type S-670 Latex Interflex Adhesive™, and was produced by Armstrong World Ind. Inc., Lancaster, Pa. The vinyl flooring used was also produced by Armstrong World Ind. Inc. In FIG. 6, the PF treated panel refers to a panel treated with the phenolic foam #1 of Table 2 and the PU treated panel refers to a panel treated with the polyurethane foam described above in connection with Table 2. Note that in FIG. 6, the adhesive used in this experiment was designed for porous materials. Lower bond strengths were observed when an adhesive which was designed for use with nonporous substrates was tried. It should also be noted that the polyurethane treated board yielded significantly lower bond strengths than did the phenolic treated board.

Having described the principal of our invention with reference to several preferred embodiments, it should be apparent to those of ordinary skill in the art that our invention may be varied in arrangement and detail without departing from such principal. We claim as our invention all such variations as fall within the scope of the following claims.

We claim:

1. A composite panel comprising:

cellulosic particles formed into a panel with first and second major surfaces with irregularities including projecting ridges and recessed voids;

a phenolic based polymeric surface coating material covering at least one of the first and second major surfaces; and the surface coating material having a cured unfoamed skin of the phenolic based polymeric surface coating material, the surface coating material being present as a skin without underlying foamed coating material over ridges of at least one of the first and second major surfaces and a cured unfoamed skin with underlying foamed coating material of the phenolic based polymeric material over recessed voids of said at least one of the first and second major surfaces.

2. A composite panel according to claim 1 in which the said at least one of the first and second major surfaces has a point caliper coefficient of variation of less than 1.0.

3. A composite panel according to claim 1 in which the cellulosic particles comprise wood flakes.

4. A composite panel according to claim 1 in which each of the first and second major surfaces have a polymeric surface coating with a skin of the polymeric surface coating material at the exterior of the panel.

5. A composite panel according to claim 1 which is from about one-eighth to about six inches thick as measured between the major surfaces.

6. A composite panel according to claim 1 in which the polymeric material is present from about 0.1 to about 50 lb. per 1,000 $ft^2$ of surface area.

7. A composite panel according to claim 1 in which the polymeric material is present in an about from about 5 to about 15 lb. per 1000 $ft^2$ of surface area.

8. A composite panel comprising:

cellulosic particles formed into a panel with first and second major surfaces with irregularities including projecting ridges and recessed voids;

a polymeric surface coating material on at least one of the first and second major surfaces;

the surface coating material having a cured unfoamed skin of the polymeric material, the surface coating material being present as a skin without underlying foamed coating material over ridges of at least one of the first and second major surfaces and a cured unfoamed skin with underlying foamed coating material of the polymeric material over recessed voids of said at least one of the first and second major surfaces.

9. A composite panel according to claim 8 in which the skin is in direct contact with at least a portion of said at least one major surface.

10. A composite panel according to claim 8 in which the foamed polymeric surface coating is a foamed phenolic based polymeric surface coating.

11. A composite panel according to claim 8 in which the skin is about five microns thick.

12. A floor underlayment panel comprising:

cellulosic particles formed into a panel with first and second major surfaces having recessed gaps, the first major surface being an upper surface of the floor underlayment when the floor underlayment is positioned on a floor;

a phenolic based polymeric surface coating material including a cured unfoamed skin covering at least the first major surface, the surface coating material including foamed coating material of the phenolic based polymeric material positioned solely under the skin and filling the gaps.

13. A floor underlayment panel according to claim 12 which is resistant to the absorption of water in that a six inch by six inch sample positioned above and with the first surface in contact with a continuously wet five and one-half by five and one-half inch sponge and with a 230 gram weight on the sample results in a water absorption of 13.3 percent by mass over a seven day period.

14. A floor underlayment panel according to claim 12 which emits no more than 0.02 parts per million formaldehyde.

15. A floor underlayment panel according to claim 12 in which the surface coating comprises a barrier to the passage of stains through the surface coating from the cellulosic particles which have been formed into the panel.

16. A floor underlayment panel according to claim 12 in which the membrane is about five microns thick with a typical density of about eighty pounds per cubic foot.

17. A floor underlayment panel according to claim 12 which is unsanded.

18. Plural floor underlayment panels mounted to a floor to provide a smooth upper first surface to which floor finishing materials may be affixed, the plural panels each comprising:

cellulosic particles formed into a panel with first and second major surfaces with irregularities including projecting ridges and recessed voids, the first major surface being an upper surface of the floor underlayment when the floor underlayment is positioned on a floor;

a phenolic based polymeric surface coating material covering at least the first major surface, the surface coating material covering the first major surface being smooth with a point caliper coefficient of variation of less than 1.0, the surface coating material having a cured unfoamed skin of the phenolic based polymeric surface coating material, the surface coating material being present as a skin without underlying foamed coating material over ridges of at least one of the first and second major surfaces and a cured unfoamed skin with underlying foamed coating material of the phenolic based polymeric material over recessed voids of said at least one of the first and second major surfaces.

19. A composite panel comprising:

cellulosic particles formed into a panel with first and second major surfaces with irregularities including projecting ridges and recessed voids;

a phenolic based polymeric surface coating material covering at least one of the first and second major surfaces, the coating material having a cured unfoamed skin of a first density at the exterior of said at least one of the first and second major surfaces, the coating material being foamed beneath the skin in recessed void areas with the foamed coating material having a density which is less than the first density, the cured unfoamed skin being in direct contact with the ridge areas and spaced from the recessed void areas by the foamed coating material; and the coated at least one of the first and second major surfaces having a coefficient of variation of less than 1.0 without sanding.

* * * * *

UNITED STATES PATENT AND TRADEMARK OFFICE

CERTIFICATE OF CORRECTION

PATENT NO. : 5,436,069
DATED : July 25, 1995
INVENTOR(S) : Winterowd, et al.

It is certified that error appears in the above-indentified patent and that said Letters Patent is hereby corrected as shown below:

On the title page item [73], should read--Weyerhaeuser Company, Tacoma, Washington --

Signed and Sealed this

Twenty-seventh Day of March, 2001

*Attest:*

NICHOLAS P. GODICI

*Attesting Officer*

*Acting Director of the United States Patent and Trademark Office*